US012111812B1

(12) United States Patent
Pfeiler et al.

(10) Patent No.: US 12,111,812 B1
(45) Date of Patent: *Oct. 8, 2024

(54) SYSTEMS AND METHODS FOR GENERATING AND MAINTAINING DATA OBJECTS

(71) Applicant: Wells Fargo Bank, N.A., San Francisco, CA (US)

(72) Inventors: Kristine Pfeiler, San Francisco, CA (US); Matthew Cady, San Francisco, CA (US); Brian Leahy, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 91 days.

This patent is subject to a terminal disclaimer.

(21) Appl. No.: 17/867,557

(22) Filed: Jul. 18, 2022

Related U.S. Application Data

(63) Continuation of application No. 17/095,197, filed on Nov. 11, 2020, now Pat. No. 11,392,573.

(51) Int. Cl.
*G06F 16/23* (2019.01)
*G06F 16/28* (2019.01)

(52) U.S. Cl.
CPC ............ *G06F 16/23* (2019.01); *G06F 16/284* (2019.01)

(58) Field of Classification Search
CPC ............................... G06F 16/23; G06F 16/284
USPC ........................................................ 707/688
See application file for complete search history.

(56) References Cited

U.S. PATENT DOCUMENTS

| | | | |
|---|---|---|---|
| 6,742,015 B1 | 5/2004 | Bowman-Amuah | |
| 7,401,057 B2 | 7/2008 | Eder | |
| 7,730,063 B2 | 6/2010 | Eder | |
| 7,739,316 B2 | 6/2010 | Thompson et al. | |
| 7,840,891 B1 * | 11/2010 | Yu | G06F 40/174 715/223 |
| 7,856,486 B2 | 12/2010 | Robertson et al. | |

(Continued)

OTHER PUBLICATIONS

Boadway, Cyrus, A Context Management Framework to Support Context-Aware Pervasive Computing,Diss. 2012.,https://qspace.library.queensu.ca/bitstream/handle/1974/7430/BOADWAY_CYRUS_M_201208_MSC.pdf?sequence=1, pp. 1-118.

(Continued)

*Primary Examiner* — Kuen S Lu
(74) *Attorney, Agent, or Firm* — Foley & Lardner LLP

(57) ABSTRACT

Systems and methods for generating and maintaining data objects may include server(s) for receiving first and second data points associated with entities and root relationships between entities. The first data points may have entity values which are defined according to an entity type and one or more attributes of the entity. The second data points may have relationship values which are defined according to a root relationship type and one or more attributes of the root relationship. The server(s) may generate entity base layer data objects and relationship base layer data objects for the first and second data points. The server(s) may provide access to base layer data objects for identifying contextual relationships between respective base layer data objects. The contextual relationships may be identified by applying conditional rules received from a computing device to data corresponding to the entity values and/or the relationship values.

20 Claims, 5 Drawing Sheets

(56) References Cited

U.S. PATENT DOCUMENTS

| | | | |
|---|---|---|---|
| 8,090,754 B2 | 1/2012 | Schmidt et al. | |
| 8,219,974 B2 | 7/2012 | Schmidt | |
| 8,234,387 B2 | 7/2012 | Bradley et al. | |
| 8,601,490 B2 | 12/2013 | Sureshan et al. | |
| 8,606,723 B2 | 12/2013 | Seubert et al. | |
| 8,674,993 B1 | 3/2014 | Fleming et al. | |
| 8,713,025 B2 | 4/2014 | Eder | |
| 8,856,087 B2 | 10/2014 | Greene et al. | |
| 8,984,479 B2 | 3/2015 | Schmidt | |
| 9,235,833 B2 | 1/2016 | Bradley et al. | |
| 9,235,834 B2 | 1/2016 | Bradley et al. | |
| 9,317,843 B2 | 4/2016 | Bradley et al. | |
| 9,424,564 B2 | 8/2016 | Bradley et al. | |
| 9,430,552 B2 | 8/2016 | Adya et al. | |
| 9,461,876 B2 | 10/2016 | Van Dusen et al. | |
| 9,466,054 B1 | 10/2016 | Bradley et al. | |
| 9,792,160 B2 | 10/2017 | Shear et al. | |
| 9,886,245 B2 | 2/2018 | Kotman et al. | |
| 9,904,579 B2 | 2/2018 | Shear et al. | |
| 10,127,569 B2 | 11/2018 | Bishop et al. | |
| 10,268,742 B2 | 4/2019 | Adya et al. | |
| 10,304,021 B2 | 5/2019 | Soloway | |
| 10,540,205 B2 | 1/2020 | Shear et al. | |
| 2005/0267871 A1 | 12/2005 | Marchisio et al. | |
| 2006/0184473 A1 | 8/2006 | Eder | |
| 2006/0195460 A1 | 8/2006 | Nori et al. | |
| 2008/0120129 A1* | 5/2008 | Seubert | G06Q 40/125 705/305 |
| 2008/0256069 A1 | 10/2008 | Eder | |
| 2009/0083738 A1* | 3/2009 | Kruglick | G06F 16/27 718/100 |
| 2009/0271342 A1 | 10/2009 | Eder | |
| 2009/0313041 A1 | 12/2009 | Eder | |
| 2010/0125562 A1 | 5/2010 | Nair et al. | |
| 2012/0010867 A1 | 1/2012 | Eder | |
| 2012/0158633 A1 | 6/2012 | Eder | |
| 2014/0006089 A1 | 1/2014 | Penning et al. | |
| 2014/0143178 A1 | 5/2014 | Haaf et al. | |
| 2014/0180738 A1 | 6/2014 | Phillipps et al. | |
| 2015/0131794 A1 | 5/2015 | Ellis et al. | |
| 2015/0134430 A1 | 5/2015 | Ellis et al. | |
| 2015/0135067 A1 | 5/2015 | Ellis et al. | |
| 2015/0135101 A1 | 5/2015 | Ellis et al. | |
| 2016/0011725 A1* | 1/2016 | D'Argenio | G06F 3/0482 715/825 |
| 2016/0196587 A1 | 7/2016 | Eder | |
| 2017/0052766 A1 | 2/2017 | Garipov | |
| 2018/0024901 A1 | 1/2018 | Tankersley et al. | |
| 2019/0265971 A1 | 8/2019 | Behzadi et al. | |
| 2020/0159579 A1 | 5/2020 | Shear et al. | |

OTHER PUBLICATIONS

Kabzeva, Aneta, Joachim Gotze, and Paul Muller, Model-based relationship management for service networks, International Journal of Systems and Service-Oriented Engineering (IJSSOE) 5.4 (2015): 104-132, pp. 1-3.

Kevin Joseph Routhier; Entity-Relationship versus Object-Oriented Modeling and the Underlying DBMS; No. AFIT/GCS/ENG/92D-15. Air Force Inst of Tech Wright-Patterson AFB OH School of Engineering, 1992, Located via Google Scholar, free copy available at https://apps.dtic.mil/dtic/tr/fulltext/u2/a259017.pdf,pp. 1-165.

Lich, Kristen & Urban, Jennifer & Frerichs, Leah & Dave, Gaurav. (2016). Extending systems thinking in planning and evaluation using Group Concept Mapping and System Dynamics to tackle complex problems. Evaluation and Program Planning. 60. 10.1016/j.evalprogplan.2016.10.008. (Year: 2016).

Stacey Tucker-Blosch: "Oracle? General Ledger User's Guide", Release 12.1, Aug. 2010 (Year: 2010).

* cited by examiner

SYSTEMS AND METHODS FOR GENERATING AND MAINTAINING DATA OBJECTS

CROSS-REFERENCE TO RELATED PATENT APPLICATIONS

This application is a continuation of U.S. patent application Ser. No. 17/095,197, filed Nov. 11, 2020, the contents of which are incorporated herein by reference in its entirety.

BACKGROUND

Provider institutions, such as financial institutions, can maintain information relating to other entities, such as customers of the provider. In some instances, a provider may be required to collect and store data corresponding to particular relationships (such as counterparty relationships). However, collecting and storing data is typically targeted and driven by a definition of the particular relationship.

SUMMARY

Various embodiments discussed herein relate to systems and methods for providing a rules-based and modular relationship mapping. In various embodiments, the systems and methods described herein provide a connected entity model which enables or provides for capture and management of data points or other information regarding relationships between entities. For example, the systems and methods described herein provide a modular relationship mapping whereby multiple contexts are supported to provide purpose-specific defined relationships and uses.

At least one aspect of this disclosure is directed to a system. The system may include one or more servers communicably coupled to a plurality of computing devices. The one or more servers may be configured to receive, from a first computing device, a plurality of first data points associated with a respective plurality of entities. The plurality of first data points may have one or more entity values which are defined according to an entity type for an entity and one or more attributes of the entity. Each root relationship may be between two or more entities having a homogeneous or heterogeneous entity types. The one or more servers may be configured to receive, from the first computing device, a plurality of second data points associated with one or more root relationships between two or more of the plurality of entities. The plurality of second data points may have one or more relationship values which are defined according to a root relationship type and one or more attributes of the root relationship. The one or more servers may be configured to generate a plurality of base layer data objects including a plurality of entity base layer data objects for the plurality of first data points and a plurality of relationship base layer data objects for the plurality of second data points. The plurality of base layer data objects may include data corresponding to the one or more entity values and/or the one or more relationship values. The one or more servers may be configured to provide, to the plurality of computing devices including the first computing device, access to the plurality of base layer data objects for identifying contextual relationships between respective base layer data objects. The contextual relationships may be identified by the one or more servers by applying one or more conditional rules received from a respective computing device of the plurality of computing devices to the data corresponding to the one or more entity values and/or the one or more relationship values. The conditional rules may be defined according to a context of the respective computing device.

At least one aspect of this disclosure relates to a method. The method may include receiving, by one or more servers from a first computing device, a plurality of first data points associated with a respective plurality of entities. The plurality of first data points may have one or more entity values which are defined according to an entity type for an entity and one or more attributes of the entity. Each root relationship may be between two or more entities having a homogeneous or heterogeneous entity types. The method may include receiving, by the one or more servers, from the first computing device, a plurality of second data points associated with one or more root relationships between two or more of the plurality of entities. The plurality of second data points may have one or more relationship values which are defined according to a root relationship type and one or more attributes of the root relationship. The method may include generating, by the one or more servers, a plurality of base layer data objects including a plurality of entity base layer data objects for the plurality of first data points and a plurality of relationship base layer data objects for the plurality of second data points. The plurality of base layer data objects may include data corresponding to the one or more entity values and/or the one or more relationship values. The method may include providing, by the one or more servers to the plurality of computing devices including the first computing device, access to the plurality of base layer data objects for identifying contextual relationships between respective base layer data objects. The contextual relationships may be identified by the one or more servers by applying one or more conditional rules received from a respective computing device of the plurality of computing devices to the data corresponding to the one or more entity values and/or the one or more relationship values. The conditional rules may be defined according to a context of the respective computing device.

At least one aspect of this disclosure relates to a non-transitory computer readable medium having instructions stored thereon. The instructions, when executed by a processor, cause the processor to receive, from a first computing device, a plurality of first data points associated with a respective plurality of entities. The plurality of first data points may have one or more entity values which are defined according to an entity type for an entity and one or more attributes of the entity. Each root relationship may be between two or more entities having a homogeneous or heterogeneous entity types. The instructions may further cause the processor to receive, from the first computing device, a plurality of second data points associated with one or more root relationships between two or more of the plurality of entities. The plurality of second data points may have one or more relationship values which are defined according to a root relationship type and one or more attributes of the root relationship. The instructions may further cause the processor to generate a plurality of base layer data objects including a plurality of entity base layer data objects for the plurality of first data points and a plurality of relationship base layer data objects for the plurality of second data points. The plurality of base layer data objects may include data corresponding to the one or more entity values and/or the one or more relationship values. The instructions may further cause the processor to provide, to the plurality of computing devices including the first computing device, access to the plurality of base layer data objects for identifying contextual relationships between respective base layer data objects. The contextual relationships may be identified by the one or more servers by applying one or more conditional rules received from a respective computing device of the plurality of computing devices to the data corresponding to the one or more entity values and/or the one or more relationship values. The conditional rules may be defined according to a context of the respective computing device.

DETAILED DESCRIPTION

Figure 1:
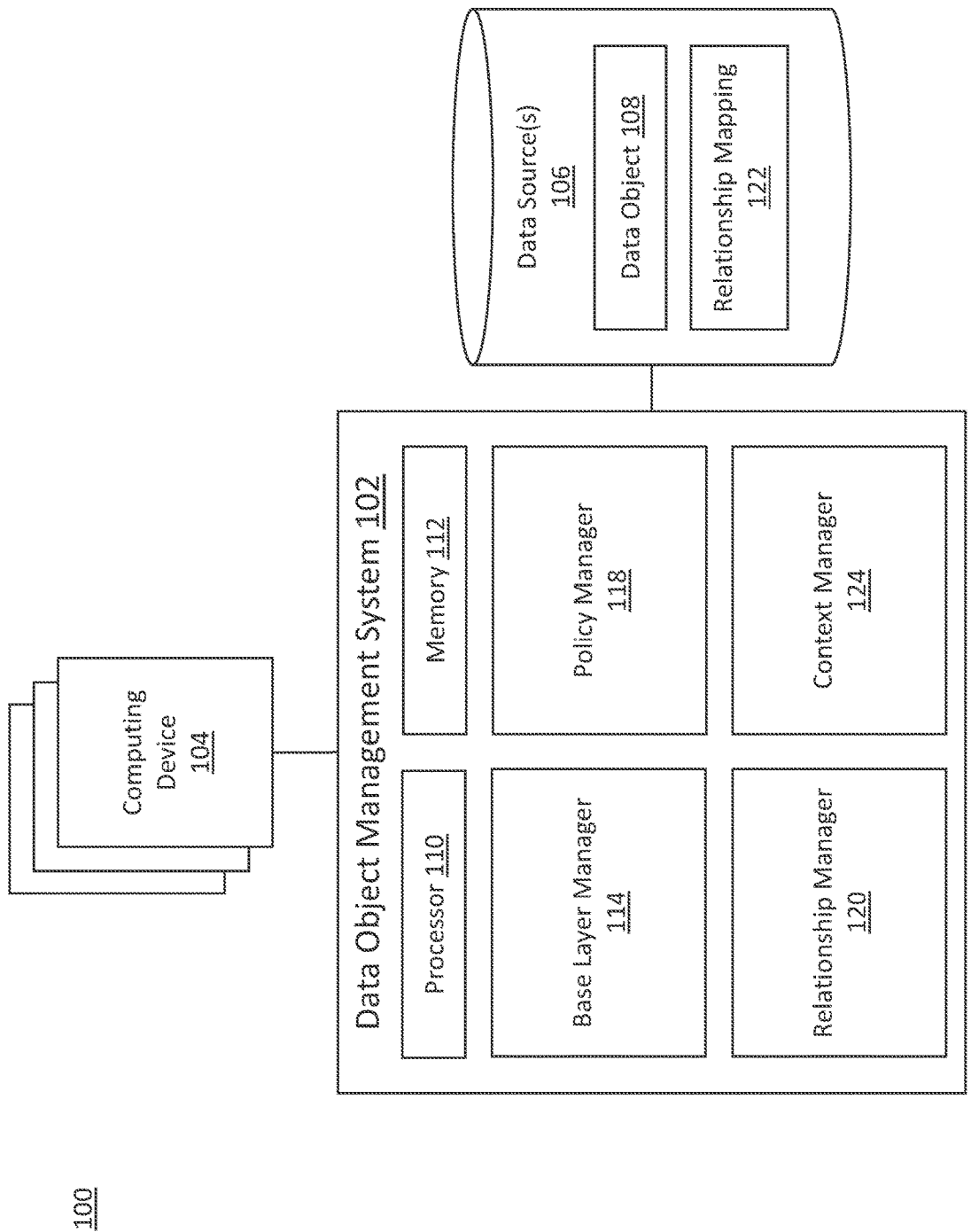
FIG. 1 is a block diagram of a system for providing a dynamic user interface for storing and verifying data, according to an example embodiment.

Various embodiments discussed herein relate to systems and methods for providing a rules-based and modular relationship mapping. In various embodiments, the systems and methods described herein provide a connected entity model which enables or provides for capture and management of data points or other information regarding entities and relationships between entities. The systems and methods described herein may provide data objects which correspond to particular entities, and data objects corresponding to relationships between respective entities. The data objects may include values corresponding to various attributes of the entities/relationships. These data objects may be accessible across a wide variety of computing systems within an enterprise for defining contextual relationships between entities. As such, rather than individual contextual relationships being identified on a case-by-case basis by respective computing systems, the systems and methods described herein may leverage the data objects (e.g., stored at a centralized server or data structure) to identify entities which satisfy given conditional rule corresponding to a contextual relationship. Such embodiments may provide for wide applications of contextual-based rules and relationships in different business units, and decrease overall data storage costs, as described in greater detail below.

As one potential example, within a financial services application, managing exposure to a counterparty is an increasingly complex task, due in part to extensive relationships one counterparty may have with another entity. Additionally, as laws and regulations modify a definition of a counterparty for various applications, such modified definitions may be difficult to implement into an existing framework. For example, as a definition of a counterparty is changed, a financial counterparty computing system may prompt an entity for information which fits the new definition of counterparties, which may subsequently be stored at the computing system. On the other hand, such information may be maintained by another computer system associated with a different business entity (such as a business loan computer system). Accordingly, data and information may be saved or otherwise stored in multiple instances and across a plurality of business entity computing systems.

According to the embodiments described herein, a computing device associated with identification of counterparties may establish or generate a conditional rule for identifying contextual (e.g., counterparty) relationships. The conditional rule may leverage data corresponding to values from various entity base layer data objects associated with respective entities or relationships. Once the conditional rule is generated by the computing device, the computing device may transmit the conditional rule to a centralized server which applies the conditional rules to the entity base layer data objects (and/or relationship base layer data objects) to identify entities which satisfy the counterparty relationship. The entity and relationship base layer data objects may include additional data, which may be used within the same context (e.g., for subsequent or modified conditional rules for identifying counterparties), and may also be used within different contexts, as described below. Such embodiments eliminate redundant storage of data at different computing systems by offloading data to the centralized servers for establishment of data objects, which may then be used in turn by the computing systems.

Various other examples outside of financial industries can similarly benefit from the flexible, modular data-driven systems and methods described herein. For example, the systems and methods described herein may be leveraged to also provide data corresponding to potential opportunities based on data corresponding to a changing market with various businesses exiting or consolidating. For example, the systems and methods described herein may be used to leverage a new a business development context as the base of new analytics, which may be used in conjunction with artificial intelligence or machine learning models for predicting new business development opportunities.

According to various embodiments, the systems and methods described herein can provide an adaptive and modular system form management of data across a wide variety of diverse computing systems. The systems and methods described herein capture and manage elemental (or base layer) data objects which are defined based on a type (e.g., an entity or a relationship type), various attributes corresponding to the particular types, and one or more constraints to the attributes. The systems and methods described herein can be configured to facilitate identification of context and purpose-driven relationships between data objects with various types of specificity to satisfy a regulation-specific definition (or other changing definition). Current solutions and approaches may manage business-specific definitions or various versions of business-specific definitions on a case-by-case basis, rather than breaking down a definition into an elemental level with a configurable purpose-specific and rules-based definition of a relationship.

The systems and methods described herein provide various improvements over existing technology and current solutions. For example, such implementations and embodiments may improve the functionality of computers or other components by reducing redundancy in having to collect and store data across a plurality of computing systems to fit variations of definitions. Rather, the systems and methods described herein can provide a centralized data store, structure, or server(s) which maintain data objects corresponding to entities and root relationships, thus eliminating any need of the separate computing systems to independently store such data on a case-by-case basis, thus limiting overall computing resources and freeing up memory space of an entire computing system. Furthermore, the systems and methods described herein can break down and map root relationships into elemental pieces (or base layers), to thereby construct or identify contextual relationships according to any variation of a definition, which may be applicable across different platforms and different contexts. As such, a plurality of computing systems and devices, which each may support or be associated with different contexts, may leverage data from the centralized server(s) for identifying contextual relationships which are associated with the respective computing systems. Furthermore, since the base layer data objects include a plurality of attributes may be universally applicable, the systems and methods described herein may be adaptable to conform to changing rules and regulations. Such embodiments may decrease overall computing resources by eliminating processing resources which would be consumed resulting from obtaining additional information as needed responsive to a change in rules and regulations on a case-by-case basis. Additionally, since such changes in rules and regulations may be implemented and processed in near real-time (e.g., by updating a conditional rule or by generating a new conditional rule), such embodiments may deliver results and identified entities which satisfy a contextual relationship faster than traditional systems. Various other benefits and improvements are described in greater detail below.

Referring now to FIG. 1, a block diagram of a computer-implemented system 100 for managing data objects, according to an example embodiment. As shown, the system 100 includes a data object management system 102 communicably coupled to one or more computing devices 104 and one or more data sources 106. As described in greater detail below, the data object management system 102 may be configured to receive various data points from the computing device(s) 104 for generating data objects. The data points may correspond to an entity or a root relationship between two or more entities, and may include data corresponding to attributes of the entity/root relationship. The data object management system 102 may be configured to generate one or more base layer data objects 108 corresponding to the data points and data corresponding thereto received from the computing device 104, which may be maintained by the data object management system 102 (such as within the data source(s) 106). Once the data object management system 102 generates base layer data objects, the data object management system 102 may be configured to receive one or more conditional rules for defining a contextual relationship between two or more entities from the computing device(s) 104. The data object management system 102 may be configured to apply the conditional rules to the data objects 108 to identify base layer data objects 108 which satisfy the conditional rules. The data object management system 102 may be configured to store an association with the base layer data objects 108 in the data source(s) 106.

As described in greater detail below, the data object management system 102 may be configured to generate base layer data objects 108 which include elemental values which represent an entity or a root relationship between two entities. The data object management system 102 may then use the base layer data objects 108 and a context or purpose-specific definition of a relationship to identify entities which satisfy the definition of the relationship. Such embodiments provide for an agnostic platform which can be adapted to define relationships according to changing definitions and rules. Additionally, through the use of base layer data objects 108, the data object management system 102 can adapt to changing definitions as a result of updated or new rules or regulations, newly defined relationships, and so forth. Rather than relying on a targeted acquisition of data to identify entities which satisfy a purpose-specific definition of a relationship, the systems and methods described herein may leverage values from the base layer data objects 108 to identify entities which satisfy the purpose-specific definition of the relationship. Such embodiments may decrease consumption of computational resources by eliminating redundancies resulting from targeted acquisition of data at each instance where a purpose-specific definition of a relationship changes. Additionally, by leveraging data from the base layer data objects, the systems and methods described herein may increase the efficiency of the data object management system 102 by eliminating such redundancies. Various other benefits of the systems and methods described herein are described in greater detail below.

As shown in FIG. 1, the data object management system 102 may be communicably coupled to one or more computing device(s) 104 and one or more data source(s) 106. In some embodiments, the data object management system 102 may be communicably and operatively coupled to the computing device(s) 104 and/or data source(s) 106 through one or more networks, which may include one or more of the Internet, cellular network, Wi-Fi, Wi-Max, a proprietary banking network, or any other type of wired or wireless network or a combination of wired and wireless networks. In some embodiments, data object management system 102 may be communicably and operatively coupled to the computing device(s) 104 and/or data source(s) 106 via a series of network connections (e.g., LAN, WAN, or the Internet) through a variety of wired and/or wireless or cellular connections. In some embodiments, the data object management system 102 may be housed, maintained, or otherwise provided by one or more servers (e.g., a server or server bank).

The data object management system 102 may include one or more processors 110 and memory 112. The processors 110 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Memory 112 may include volatile memory (e.g., RAM), non-volatile memory (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof).

The system 100 may include a plurality of computing devices 104. The computing devices 104 may be, for example, a desktop, laptop, mobile device, smartphone, tablet, or other form of computing device 104. In some embodiments, the computing devices 104 may be associated with the data object management system 102. For example, the data object management system 102 may be maintained or otherwise provided by an institution or enterprise (such as a financial institution), and the computing devices 104 may be maintained or otherwise provided by the institution or enterprise. In some embodiments, the computing devices 104 may be third-party computing devices 104 which enroll with the or otherwise are communicably coupled with the data object management system 102. For example, the computing devices 104 may correspond to an entity which enrolls with the data object management system 102 (such as a customer, a business, or other enterprise). As another example, the computing devices 104 may correspond to an entity which validates or otherwise verifies data received by the data object management system 102. In some embodiments, the system 100 may include institutional computing device(s) 104, entity computing device(s) 104, and/or third-party verification computing device(s) 104.

As described in greater detail below, the data object management system 102 may be configured to receive one or more data points from the computing device(s) 104 for generating various data objects 108. The data object management system 102 may be configured to receive one or more conditional rules corresponding to a contextual relationship between two entities. The data object management system 102 may be configured to identify entities satisfying the contextual relationship using the conditional rule(s) and data corresponding to the data objects 108. The data object management system 102 may be configured to store an association between data objects 108 which satisfy the conditional relationship in accordance with the contextual relationship.

Section 1. Generating Base Layer Data Objects

Figure 2:
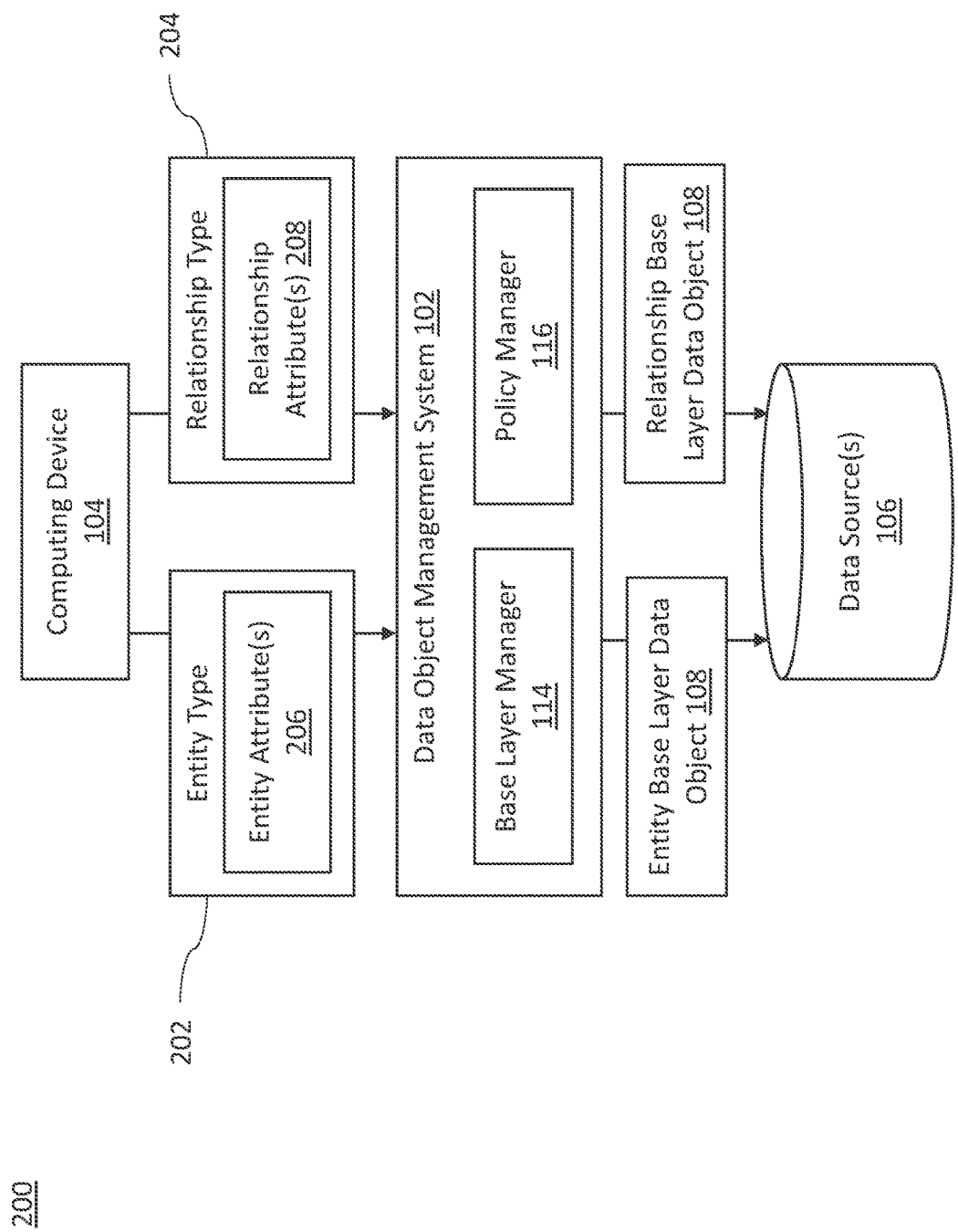
FIG. 2 depicts an exemplary user interface, according to an example embodiment.

Referring now to FIG. 1 and FIG. 2, the data object management system 102 may be configured to generate, maintain, or otherwise provide one or more base layer data objects 108 (referred to generally as "data objects 108"). Specifically, FIG. 2 shows a block diagram of a system 200 for generating base layer data objects 108. The system 200 may include various components of the system 100 of FIG. 1, such as the data object management system 102, the computing device(s) 104, and the data source(s) 106.

In some embodiments, the data object management system 102 may include a base layer manager 114. The base layer manager 114 may be or include any device, component, software, script, set of processor-executable instructions, or combination of hardware and software designed or implemented to generate one or more base layer data objects 108. The base layer manager 114 may be configured to generate the base layer data objects 108 using data corresponding to one or more data points received from the computing device 104. In some embodiments, the data object management system 102 may be configured to provide a user interface to the computing device 104 for generating the one or more data points. For example, the user interface may include various fields for selecting or otherwise providing various values for defining the data points. The data object management system 102 may be configured to receive entity data points and root relationship data points. Each of the data points are described in greater detail below.

The data object management system 102 may be configured to receive one or more entity data points 202 which correspond to an entity. In some embodiments, the entity data points may be or include an entity type and one or more attributes 206 of the entity. A user of the computing device 104 may select the entity type on a user interface provided by the data object management system 102. The entity type may be specified as a first component within the base layer to be maintained by the data object management system. The entity types may be or include individual entities, organization entities, real or personal property entities, contract entities, and so forth. Once an entity type is selected or otherwise defined for the entity data point 202, the user may provide values corresponding to one or more attributes 206 for defining the particular entity data point 202. The values corresponding to an attribute 206 of the entity data point 202 may define or characterize, e.g., at a granular level, the corresponding entity. In some embodiments, a particular entity type may include corresponding attributes 206 which are relevant thereto. For example, where the entity type is a university entity, an attribute 206 corresponding to the particular entity type may include an attribute corresponding to whether the university is a public or private university. As another example, where the entity type is a corporate entity, an attribute 206 corresponding to the particular entity type may include attributes corresponding to number of employees, a public or private status of the corporation, a location of the corporate headquarters, etc.

The base layer manager 114 may be configured to receive the entity data point(s) 202 from the computing device 104 for generating entity base layer data objects 108 corresponding thereto. The base layer manager 114 may be configured to analyze, inspect, or otherwise parse the entity data points 202 received from the computing device 104 to determine that the entity data points 202 include sufficient data for generating an entity base layer data object 108 corresponding thereto. For example, the base layer manager 114 may be configured to determine that an entity data point 202 includes data which specifies an entity type for the entity data point 202, and that the entity data point 202 includes a valid value for the one or more attributes corresponding to the entity type. The base layer manager 114 may be configured to build, compile, construct, generate, or otherwise provide an entity base layer data object 108 using the data from the entity data point 202.

The base layer manager 114 may be configured to receive relationship data points 204 from the computing device 104. The relationship data points 204 may be data points which define a root relationship between two or more of the entities (e.g., associated with respective entity base layer data objects 108). A root relationship, as referred to herein, refers to an objective, measurable, quantifiable, or otherwise defined relationship between two entities. The root relationships may include entity-to-entity relationships. The root relationships may have a relationship category, which may include homogeneous relationships and heterogeneous relationships. The homogeneous relationships may include relationships between two entities having the same entity type. The heterogeneous relationships may include relationships between two entities having different entity types.

The relationship data points 204 may be generated at the computing device 104 in a manner similar to the entity data points 202. For example, the data object management system 102 may be configured to provide a user interface to the computing device 104 for defining or generating the relationship data points 204. A user may select a relationship type and provide values to various fields corresponding to attributes 208 of the particular fields. Various examples of root relationships and relationship types are provided in Table 1 below.

TABLE 1

Root Relationship and Relationship Types

| Root Relationship | Relationship Type | Left Entity Type | Right Entity Type | Directionality | Relationship Category |
|---|---|---|---|---|---|
| Equity | Ownership | Party | Party | One way | Heterogeneous |
| Board Representation | Influence | Party | Party | One way | Heterogeneous |
| Trustee Election | Influence | Party | Party | One way | Heterogeneous |
| General Partner Election | Influence | Party | Party | One way | Heterogeneous |
| Bank Holding Company Act Federal Directed | Influence | Party | Party | One way | Heterogeneous |
| Board Control | Influence | Party | Party | One way | Heterogeneous |
| Buyer Influence | Influence | Party | Party | One way | Heterogeneous |
| Revenue | Economic Receipts | Party | Party | One way | Heterogeneous |
| Funding | Economic Receipts | Party | Party | One way | Homogeneous |
| Distribution | Economic Expenditures | Party | Party | One way | Homogeneous |
| Servicing | Economic Expenditure | Party | Party | One way | Homogeneous |
| Infrastructure | Economic Expenditures | Party | Party | One way | Heterogeneous |
| Supply Chain | Economic Expenditures | Party | Party | One way | Homogeneous |
| Guarantor | Economic Guarantor | Party | Party | One way | Heterogeneous |
| Employment | Economic Employment | Party | Party | Bi-directional | Heterogeneous |
| Spouse | Familial | Party | Party | Bi-directional | Homogeneous |
| Child | Familial | Party | Party | Bi-directional | Homogeneous |
| US State - Agency | Government | Party | Party | Bi-directional | Heterogeneous |
| US State - Municipality | Government | Party | Party | Bi-directional | Heterogeneous |
| Foreign Sovereign Entity - Agency | Government | Party | Party | Bi-directional | Heterogeneous |
| Foreign Entity - Municipality/Province | Government | Party | Party | Bi-directional | Heterogeneous |
| Lease | Real Property Interest | Party | Real Property | One way | Either |
| Ownership | Real Property Interest | Party | Real Property | One way | Heterogeneous |
| Property Management | Real Property | Party | Real Property | One way | Heterogeneous |
| Obligation | Contractual | Party | Contract | One way | Either |

As shown in Table 1, the data object management system 102 may support a plurality of different root relationships and relationship types. The relationship types may be or include subset of root relationships (e.g., board representation, trustee election, general partner election each have the same relationship type of influence, distribution, servicing, and supply chain each have the same relationship type of economic expenditures, etc.). Each root relationship may be defined in terms of two entities (e.g., a left entity and a right entity). For example, to generate a relationship data point 204 corresponding to board representation, a user may select the left entity as the board member (e.g., by providing the entity name, selecting an entity data object 108 from a drop-down list of entity data objects 108, etc.), and select the right entity as the company in which the left entity is a board member (e.g., by providing the company name, selecting an entity data object 108 from a drop-down list, etc.).

As shown in Table 1, a relationship may be defined between similar (or different) entity types. For example, a contractual relationship may be formed between two business entities, which may be a homogenous relationship (since both the business entities have an organization entity type). On the other hand, where a contractual relationship is formed between an individual and a business, the relationship may be a heterogeneous relationship (since the business has an organization entity type and the individual entity type). Some relationships may be inherently homogeneous (e.g., spouse or child relationships, since such relationships are only between individual entities). Some relationships may be homogeneous or heterogeneous based on the nature of the relationship.

The relationship data point 204 may include values corresponding to a plurality of attributes 208 of the root relationship. In some embodiments, different root relationship types may include or support different types of attributes 208. The relationship data point 204 may include values corresponding to the respective attributes 208. Each of the attributes 208 of a particular relationship may be mutually exclusive from other attributes 208 of the relationship. Additionally, a user of the computing device 104 may provide inputs of values to the user interface provided by the data object management system 102 for populating the relationship data point 204. Various examples of attributes 208 which may be provided for a corresponding root relationship are provided in Table 2 below.

TABLE 2

Relationship Types and Associated Attributes

| Relationship Type | Attributes |
|---|---|
| Ownership | Accounting Consolidation? |
|  | Ultimate Beneficial? |
|  | Share % |
|  | Voting? |
|  | Voting Share %? |
| Economic Receipts | Receipts Type |
|  | % of Receipt Type |
|  | % of Total Receipts |
| Economic Expenditures | % to Total Expenditures |
|  | % Dependency |
| Influence | Count |
|  | % of Total Influence |

In the example shown in Table 2, a relationship data point 204 may include values for attributes which correspond to a particular relationship type. For instance, where a root relationship has a relationship type of economic receipts, the relationship data point 204 for the root relationship may include values which provide insight to the nature of the relationship (e.g., the type of economic receipts, the percentage of receipt types, the total percentage of receipts, and so forth). As such, the values corresponding to particular attributes may provide an elemental definition of the root relationship between two entities.

In some embodiments, the data object management system 102 may include a policy manager 116. The base layer manager 114 may be or include any device, component, software, script, set of processor-executable instructions, or combination of hardware and software designed or implemented to maintain a governing policy for generating data objects 108. The governing policy may include various constraints to maintain valid root relationships between entities. In some embodiments, the governing policy may include constraints on particular values (e.g., corresponding to a relationship type, and/or attributes corresponding to a relationship type). For instance, a governing policy may include a constraint on a particular relationship type based on a selected left and right entity. As an example, where a right entity is an individual, the governing policy may include a constraint on the relationship type as to not include an ownership (since an individual cannot be subjected to ownership, and therefore a left entity cannot have an ownership relationship with a right entity which is an individual). As another example, a governing policy may include a constraint on an attribute of an entity based on a particular relationship type. For instance, where a left entity is has a beneficial ownership relationship with a right entity, the governing policy may include a constraint on the left entity as to be limited to individuals (since non-individuals cannot have a beneficial ownership relationship).

The policy manager 116 may be configured to apply the governing policy to the data points received from the computing device 104 to determine whether to generate a data object 108 corresponding to the data point. The policy manager 116 may be configured to apply the governing policy to the entity data points 202 and to the relationship data points 204 to determine whether to generate an entity base layer data object 108 and relationship base layer data object 108, respectively. The policy manager 116 may be configured to apply the governing policy to the data points 202, 204 to determine whether each of the data points 202, 204 include a selected entity type, a selected relationship type, values corresponding thereto, etc. The policy manager 116 may be configured to determine whether values corresponding to attributes of the data points 202, 204 satisfy the constraints of the governing policy. Where the policy manager 116 determines that a data point 202, 204 does not satisfy the governing policy, the policy manager 116 may be configured to transmit a notification or prompt to the computing device 104 for updating the data point 202, 204 (e.g., by replacing a value with an acceptable value, by providing an entity or relationship type, etc.). On the other hand, where the policy manager 116 determines that a data point 202, 204 satisfies the governing policy, the policy manager 116 may be configured to generate a flag or indication for the data point 202, 204 which indicates that the base layer manager 114 is to generate a base layer data object 108 for the data point 202, 204.

Once the base layer manager 114 receives the data points 202, 204 (and the data points 202, 204 satisfy constraints of the governing policy), the base layer manager 114 may be configured to generate, build, compile, or otherwise provide base layer data objects 108 corresponding to the data points 202, 204. The base layer data objects 108 may be or include data which represents the entities and/or the root relationships. In other words, the base layer manager 114 may be configured to provide entity base layer data objects 108 and relationship base layer data objects 108. The base layer manager 114 may be configured to provide base layer data objects 108 for a plurality of entities and for a plurality of relationships between the entities. Examples of an entity base layer data objects 108 and a corresponding relationship base layer data object 108 are provided in Tables 3-6.

TABLE 3

Entity Base Layer Data Object Corresponding to an Individual Entity 1

| Entity | Entity Type | Entity Attribute |
|---|---|---|
| Jane Doe | Party | Individual |

TABLE 4

Entity Base Layer Data Object Corresponding to an Individual Entity 2

| Entity | Entity Type | Entity Attribute |
|---|---|---|
| John Smith | Party | Individual |

TABLE 5

Entity Base Layer Data Object
Corresponding to a Corporation
Entity 3

| Entity | Entity Type | Entity Attribute |
|---|---|---|
| XYZ Corp. | Party | Corporation |

TABLE 6

Relationship Base Layer Data Object
Corresponding to a Root Relationship
Root Relationship 1

| Relationship | Relationship Type | Left Party | Right Party | Attribute(s) | Value(s) |
|---|---|---|---|---|---|
| Equity | Ownership | Entity 1 | Entity 3 | Accounting Consolidation? | Yes |
| | | | | Ultimate Beneficial? | Yes |
| | | | | Share % | 80% |
| | | | | Voting? | Yes |
| | | | | Voting Share %? | 80% |
| Equity | Ownership | Entity 2 | Entity 3 | Accounting Consolidation? | Yes |
| | | | | Ultimate Beneficial? | Yes |
| | | | | Share % | 20% |
| | | | | Voting? | Yes |
| | | | | Voting Share %? | 20% |

In the example shown in Tables 3-6, Jane Doe and John Smith are co-owners of XYZ Corp. Jane Doe, John Smith, and XYZ Corp. may each be represented as entity base layer data objects 108 using data corresponding to an entity data point 202 received by the data object management system 102 from the computing device 104. The root relationship between Jane Doe and John Smith to XYZ Corp. may similarly be represented as a relationship base layer data object 108 using data corresponding to a relationship data point 204 received by the data object management system 102 from the computing device 104. It is noted that, while Table 6 shows a single relationship base layer data object 204, in some embodiments, the base layer manager 114 may generate separate relationship base layer data objects 204 (e.g., a first relationship base layer data object 204 representing a relationship between Jane Doe and XYZ Corp., and a second relationship base layer data object 204 representing a relationship between John Smith and XYZ Corp.).

The base layer manager 114 may be configured to maintain the base layer data objects 108 in one or more data sources. In the embodiments shown in FIG. 1 and FIG. 2, the base layer manager 114 may maintain the data objects 108 in the data source 106. In some embodiments, the base layer manager 114 may maintain the data objects 108 locally (such as within memory 112). As new data points 202, 204 are received by the base layer manager 114, the base layer manager 114 may be configured to generate new data objects 108 corresponding thereto. Additionally, the base layer manager 114 may be configured to update existing data objects 108 as data corresponding to the data objects 108 is stale or otherwise no longer accurate (for example, based on an increase in shares or voting rights). As such, each data object 108 may be enriched with values that are refreshed as the entity/relationships change.

As described in greater detail below in Section 2, the data object management system 102 may be configured to use the base layer data objects 108 and data corresponding to a contextual relationship to identify entities which satisfy the contextual relationship. As such, data corresponding to the base layer data objects 108 may be leveraged for contextual relationship mapping across industries and for various regulations, and allows the data to be used and re-used for new regulations and as regulations change. Additionally, by providing granular values corresponding to entities and root relationships, the data object management system 102 may be adaptable and agile for changing definitions without a need to solicit data each time a new regulation is added or a regulation changes.

Figure 3:
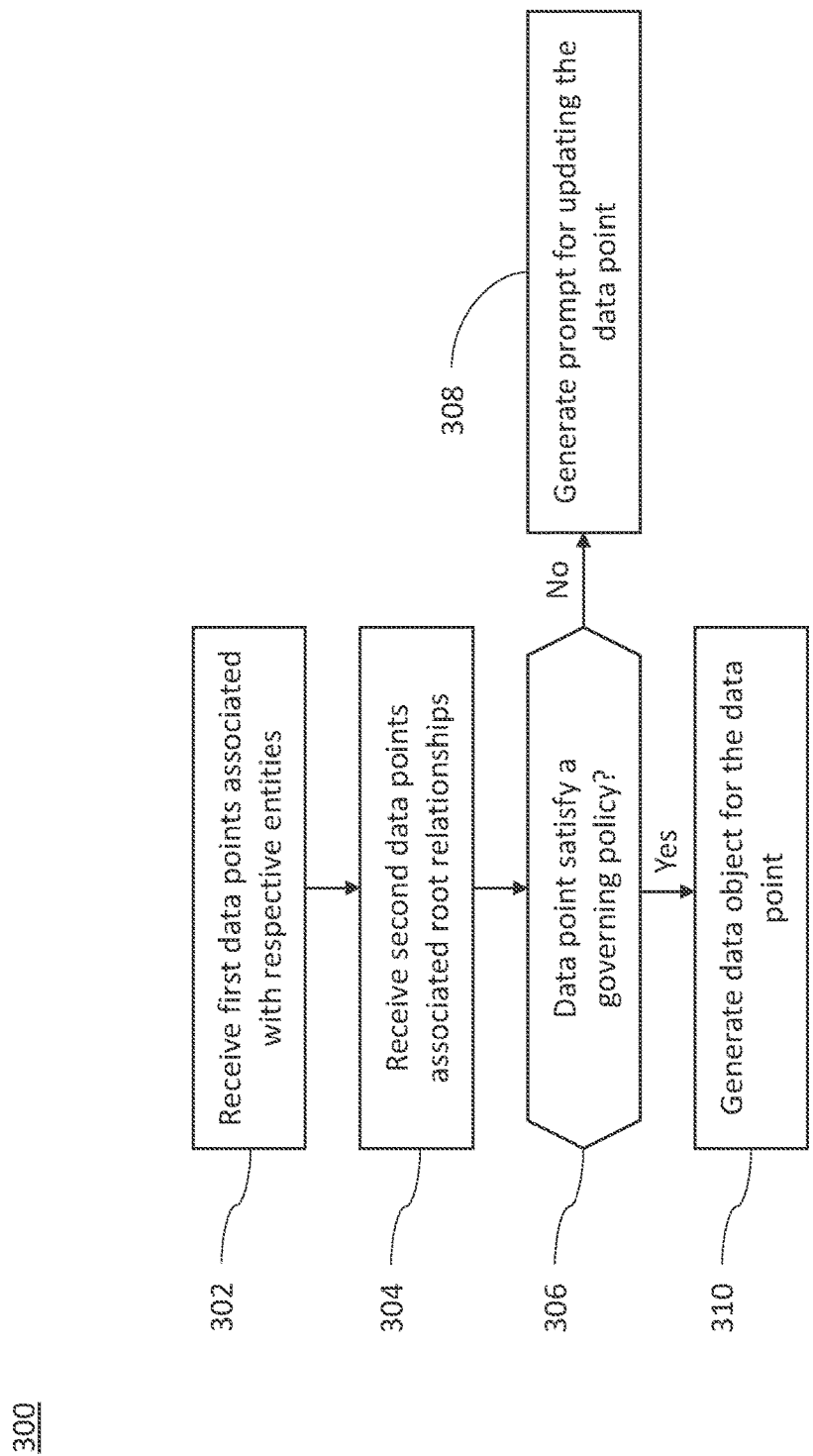
FIG. 3 depicts a flowchart showing an example method of generating a plurality of base layer data objects, according to an example embodiment.

Referring now to FIG. 3, depicted is a flowchart showing an example method 300 of generating a plurality of base layer data objects. The steps shown in FIG. 3 may be performed by various components shown in FIG. 1 and FIG. 2 described above, such as the data object management system 102 and/or one or more components thereof, the computing device(s) 104, etc. As a brief overview of the method 300, at step 302, the base layer manager 114 may receive first data points associated with respective entities. At step 304, the base layer manager 114 may receive second data points associated with root relationships. At step 306, the base layer manager 114 may apply a governing policy to a data point. Where the data point does not satisfy the governing policy, at step 308, the base layer manager 114 may generate a notification for updating the data point. Where the data point satisfies the governing policy, at step 310, the base layer manager 114 may generate a data object for the data point.

At step 302, a base layer manager 114 may receive first data points associated with respective entities. In some embodiments, the base layer manager 114 may receive a plurality of first data points associated with a respective plurality of entities from the computing device 104. In some embodiments, the plurality of first data points may include one or more entity values which are defined according to an entity type and one or more attributes of the entity. In some embodiments, a data object management system 102 may provide a user interface to the computing device 104 for generating the data points associated with respective entities. The data points may include data corresponding to an entity type and data corresponding to an entity attribute. For example, the data points may include a selected value of an entity type and one or more values corresponding to fields for entity attributes associated with the entity. In some embodiments, each of the entity types and entity attributes may be mutually from other entity types and entity attributes. In other words, the data points may include a selected value corresponding to a mutually exclusive entity type and one or more values corresponding to mutually exclusive entity attributes.

At step 304, the base layer manager 114 may receive second data points associated with root relationships. In some embodiments, the base layer manager 114 may receive a plurality of second data points associated with one or more root relationships between two or more of the plurality of entities from the computing device 104. The plurality of second data points may have one or more relationship values which are defined according to a root relationship type and one or more attributes of the root relationship. In some embodiments, the data object management system 102 may provide a user interface to the computing device 104 for generating the second data points associated with the root relationship. The second data points may include data corresponding to a relationship type and data corresponding to attributes of the root relationship. For example, and similar to the first data points, the second data points may include a selected value of a root relationship type of a root relationship between two entities and one or more values corresponding to fields for relationship attributes associated with the root relationship. Additionally, and in some embodiments, the root relationship types and relationship attributes may each be mutually exclusive from one another. In some embodiments, the relationship values may include a plurality of values which are associated with the root relationship type. Various examples of relationships, relationship types, and attributes which are specific to a particular relationship type are described above in Table 1 and Table 2 above. In some embodiments, the second data points may include a plurality of values which define the root relationship between two entities. For example, the second data points may include a first value corresponding to a relationship, a second value corresponding to a relationship type, a third value corresponding to a left entity type, a fourth value corresponding to a right entity type, and a fifth value corresponding to a directionality. In some embodiments, the second data points may include additional values which correspond to attributes of the relationship, which are particular to the root relationship type (such as those shown in Table 2).

At step 306, the base layer manager 114 may apply a governing policy to a data point. In some embodiments, the base layer manager 114 may apply the governing policy to the one or more attributes of the root relationship between two or more entities (or to the one or more attributes of an entity) to determine whether to generate a relationship base layer data object corresponding to the root relationship or the entity. The governing policy may include various constraints on acceptable values for an entity type, attributes of the entity, a relationship type, acceptable values of attributes corresponding to the relationship type, etc. In some embodiments, a policy manager 116 may be configured to apply the governing policy to the data points (e.g., received at step 302 and step 304). The policy manager 116 may be configured to apply the governing policy to determine whether data corresponding to the data points satisfy the constraints included in or corresponding to the governing policy Where the data point does not satisfy the governing policy, at step 308, the base layer manager 114 (or the policy manager 116) may generate a prompt for updating the data point. For example, the base layer manager 114 (or the policy manager 116) may generate a prompt for an updated value corresponding to the one or more attributes of the root relationship or entity. For example, the prompt may include or specify a particular value which caused the data point to not satisfy the governing policy. The base layer manager 114 (or the policy manager 116) may transmit the prompt to the computing device 104 which transmitted the data point to the base layer manager 114. The upon receiving the prompt at the computing device 104, a user of the computing device 104 may update the values corresponding to the entity/root relationship, and transmit, send, or otherwise provide the updated data point to the base layer manager 114.

Where the data point satisfies the governing policy, at step 310, the base layer manager 114 may generate a data object for the data point. In some embodiments, the base layer manager may generate a plurality of base layer data objects including a plurality of entity base layer data objects for the plurality of first data points and a plurality of relationship base layer data objects for the plurality of second data points. The plurality of base layer data objects may include data corresponding to the one or more entity, values or the one or more relationship values. Examples of the base layer data objects are shown in Table 3-Table 6 provided above (e.g., Table 3-Table 5 showing examples of entity base layer data objects, and Table 6 showing an example of a relationship base layer data object). The base layer data objects may include data corresponding to the particular entity or relationship type, a plurality of values corresponding to attributes of the entity or root relationship, and so forth. As such, the base layer data objects may include granular (or elemental) data which is representative of a particular entity (such as an individual, a corporation or company, a university, a government entity, or a non-individual) or root relationships corresponding to two entities (such as an individual and a company, for instance). As described in greater detail below, the base layer data objects may be used for identifying entities which satisfy conditional rules corresponding to a contextual relationship.

In some embodiments, the method 300 may include additional steps, such as those shown in FIG. 4 and FIG. 5 and described in greater detail below with reference thereto. For example, the method 300 may include additional steps corresponding to updating a base layer data object (e.g., as described with reference to FIG. 4), and/or leveraging data corresponding to base layer data objects for identifying contextual or potential relationships (e.g., as described with reference to FIG. 5).

Section 2. Context and Purpose-Specific Relationship Mapping

Referring back to FIG. 1, the data object management system 102 is shown to include a relationship manager 120. The relationship manager 120 may be or include any device, component, software, script, set of processor-executable instructions, or combination of hardware and software designed or implemented to maintain context and/or purpose-specific relationships between entities. The relationship manager 120 may be configured to receive one or more conditional rules from a computing device 104 for defining a relationship between two or more entities. In some embodiments, the data object management system 102 may be configured to provide a user interface for generating a conditional rule corresponding to a particular relationship. A user of the computing device 104 may provide various inputs to the user interface for defining the conditional rules. As described in greater detail below, the relationship manager 120 may be configured to identify entity base layer data objects 108 which satisfy the conditional rule, and generate a relationship mapping 122 of the entity base layer data objects 108 for storing or otherwise maintaining at the data source(s) 106.

In some embodiments, the data object management system 102 may be configured to receive conditional rules from a plurality of computing devices 104. In some implementations, computing devices 104 associated with different respective contexts may be configured to leverage data from the data object management system 102 for identifying entities which satisfy a particular contextual relationship. For example, a computing device 104 associated with a context corresponding to counterparties may be configured to generate a first conditional rule, and a computing device 104 associated with a context corresponding to lending may be configured to generate a second conditional rule. Each of the conditional rules may be associated with a respective contextual relationship (which in turn, corresponds to a context of the respective computing device 104). As described in greater detail below, the data object management system 102 may be configured to apply the conditional rules from the computing devices 104 to identify entity base layer data objects 108 which satisfy the conditional rules (and thereby have the contextual relationship).

In some embodiments, a conditional rule may be defined within a particular context. For example, the data object management system 102 may include a context manager 124. The context manager 124 may be or include any device, component, software, script, set of processor-executable instructions, or combination of hardware and software designed or implemented to maintain a plurality of contexts for supporting contextual relationships between entities within a particular context. In some embodiments, the context manager 124 may receive a context from the computing device(s) 104. The context may be the context of the particular computing device 104 (e.g., a first computing device 104 may have a context corresponding to financial service counterparties, a second computing device 104 may have a context corresponding to lending, a third computing device 104 may have a context corresponding to investments, etc.).

The context may specify particular relationships and relationship types which are contextually related to one another. For example, within a financial services counterparty context, various relationships and relationship types may be contextually related within the particular context. In some embodiments, the context manager 124 may be configured to receive a selection of each of the applicable relationship and relationship types which correspond to a particular context. For example, a user may select (e.g., on a user interface at the computing device 104) user interface elements corresponding to a particular context. As such, a context may be specified using particular types of relationship base layer data objects 108. Continuing the example of a financial services counterparty context, Table 7 below shows a list of relationships which may correspond to the financial services counterparty context.

TABLE 7

Relationship Types within a Financial Services Counterparty Context

| Context | Relationship |
|---|---|
| Financial Services Counterparty | Equity Ownership |
| Financial Services Counterparty | Board Member Election |
| Financial Services Counterparty | Trustee Election |
| Financial Services Counterparty | General Partner Election |
| Financial Services Counterparty | Bank Holding Company Act - Federal Directed |
| Financial Services Counterparty | Board Control |
| Financial Services Counterparty | Buyer Influence |
| Financial Services Counterparty | Revenue |
| Financial Services Counterparty | Funding |
| Financial Services Counterparty | Distribution |
| Financial Services Counterparty | Servicing |
| Financial Services Counterparty | Infrastructure |
| Financial Services Counterparty | Supply Chain |
| Financial Services Counterparty | Guarantor |
| Financial Services Counterparty | Spouse |
| Financial Services Counterparty | Child |
| Financial Services Counterparty | US State - Agency |
| Financial Services Counterparty | US State - Municipality |
| Financial Services Counterparty | Foreign Entity - Agency |

As shown in Table 7, a particular context may have a plurality of relationships which are relevant to the context. Additionally, a different context may have more or fewer relationships which are relevant to the context. As described in greater detail below, the context manager 124, together with the relationship manager 120, may manage, maintain, or otherwise support different context and contextual relationships which are relevant to the particular contexts.

The relationship manager 120 may be configured to receive a conditional rule which defines a contextual relationship between two entities. A contextual relationship, as used herein, refers to a defined or mapped relationship which corresponds to a particular purpose or context. The contextual relationship may be a qualifiable relationship (e.g., based on values corresponding to various attributes of a root relationship or entities of the contextual relationship). In some embodiments, a contextual relationship may be defined according to a plurality of conditional rules. Additionally, and in some embodiments, a contextual relationship may be defined by a first conditional rule, and subsequently re-defined by a second conditional rule which supersedes the first conditional rule.

In some embodiments, the relationship manager 120 may be configured to receive a sub-context (or purpose) corresponding to or associated with a particular contextual relationship within the context. Additionally, the sub-context may include a plurality of conditional rules corresponding to the particular contextual relationship. As noted above, the conditional rule may be defined according to potential values corresponding to attributes of one or more entity base layer data objects 108 or relationship base layer data objects 108. The relationship manager 120 may be configured to apply the conditional rule to data objects 108 (e.g., to values corresponding to attributes of the data objects 108) to identify a subset of data objects 108 which satisfy the conditional rule, and thereby have the contextual relationship. In some embodiments, the conditional rules for a particular contextual relationship may be executed in parallel such that two data objects 108 which satisfy any of the conditional rules may be determined by the relationship manager 120 to have the particular contextual relationship. As such, where a sub-context or purpose has a plurality of conditional rules, each of the conditional rules may function as control prongs for identifying data objects 108 which have the particular contextual relationship corresponding to the sub-context or purpose.

The conditional rules may include one or more criteria which, when satisfied, cause the conditional rule to be satisfied. In some embodiments, the criteria may be joined by an operator (such as an "AND" operator or an "OR" operator). Where the criteria are joined by an AND operator, the conditional rule may be satisfied where each of the criteria are satisfied. On the other hand, where the criteria are joined by an OR operator, the conditional rule may be satisfied where either (or any) of the criteria are satisfied. A criteria may include values corresponding to a relationship for the criteria, values corresponding to a relationship attribute for the relationship, a comparator for the values, and a value or range of values corresponding to the comparator. An example of a plurality of conditional rules, including a conditional rule with two criteria, corresponding to a control contextual relationship associated with the Bank Holding Company Act (BHCA) is provided in Table 8 below.

TABLE 8

Conditional Rules corresponding to BHCA Control Contextual Relationships

| BHCA Control Contextual Relationship | Criteria Condition | Relationship | Relationship Attribute | Comparator | Attribute Value | Operator |
|---|---|---|---|---|---|---|
| Conditional Rule 1 | 1 | Equity Ownership | Voting | = | Y | AND |
|  | 2 | Equity Ownership | % Voting | > | 25 |  |
| Conditional Rule 2 | 1 | Board Control | Y |  |  |  |
| Conditional Rule 3 | 1 | BHCA Federal Directed |  |  |  |  |

As shown in Table 8, a contextual relationship corresponding to BHCA Control may be satisfied when either of the conditional rules (e.g., conditional rule 1, conditional rule 2, conditional rule 3) are satisfied, including the criteria corresponding thereto. For example, an entity may satisfy the contextual relationship shown in Table 8 where the entity has equity ownership of a company with voting rights and a voting percentage of greater than 25%, the entity is a member of the board of the company, or the entity has or exercises control of the company pursuant to the BHCA Federal Directed rules, regulations, or guidelines. In the example from Tables 3-6 as applied to the contextual relationship from Table 8, Jane Doe may have control of XYZ Corp. (based on having a voting percentage of 80% in satisfaction of condition rule 1), whereas John Smith may not have control of XYZ Corp. (based on having a voting percentage of 20%, which does not satisfy conditional rule 1). However, if John Smith were on the board of XYZ Corp., John Smith may have control based on being a board member, in satisfaction of conditional rule 2.

The relationship manager 120 may be configured to apply the conditional rules corresponding to a contextual relationship to the entity and/or relationship base layer data objects 108 to identify various data objects 108 which satisfy the conditional rules. In some embodiments, the relationship manager 120 may be configured to identify the data objects 108 by performing a search within the data source 106 using the conditional rules. The relationship manager 120 may be configured to perform a plurality of searches within the data source 106 using each of the conditional rules. The relationship manager 120 may be configured to perform the searches in parallel, in series, etc. Once the relationship manager 120 identifies base layer data objects 108 which satisfy a particular conditional rule, the relationship manager 120 may be configured store an association between the base layer data objects 108 in the data source(s) 106. The association may be, for instance, a relationship mapping 122 between a first entity base layer data object 108 and a second base layer data object 108 according to the contextual relationship. In the example described above, the relationship manager 120 may be configured to identify the entity base layer data object 108 corresponding to Jane Doe and the entity base layer data object 108 corresponding to XYZ Corp. based on the relationship base layer data object 108 having values which indicates that Jane Doe has equity ownership of XYZ Corp. with voting rights which are greater than 25%. Once the relationship manager 120 identifies the entity base layer data object 108 corresponding to Jane Doe and the entity base layer data object 108 corresponding to XYZ Corp., the relationship manager 120 may be configured to store an association of the entity base layer data objects 108 (e.g., a relationship mapping 122 of the entity base layer data objects 108) in the data source 106 which indicates that the corresponding base layer data objects 108 satisfy a conditional rule (e.g., conditional rule 1) of the contextual relationship. The relationship mapping 122 may include data corresponding to the particular context, data corresponding to the particular contextual relationship, etc.

In some embodiments, the relationship manager 120 may be configured to support adding additional conditional rules and/or superseding existing conditional rules. For example, where a contextual relationship has a new or updated definition (e.g., by way of a new law or regulation, a change in law or regulation, etc.), the relationship manager 120 may be configured to receive a new or updated conditional rule based on the new or updated definition. The relationship manager 120 may be configured to apply the new or updated conditional rule to existing associated entity base layer data objects 108 (e.g., to the relationship base layer data object 108 corresponding to the entities determine whether the associated entity base layer data objects 108 satisfy the updated conditional rule), and/or to other relationship base layer data objects 108 to determine whether any entities satisfy the new conditional rule. As such, the data object management system 102 may be adaptable to conform to new or additional conditional rules and across different contexts.

Figure 4:
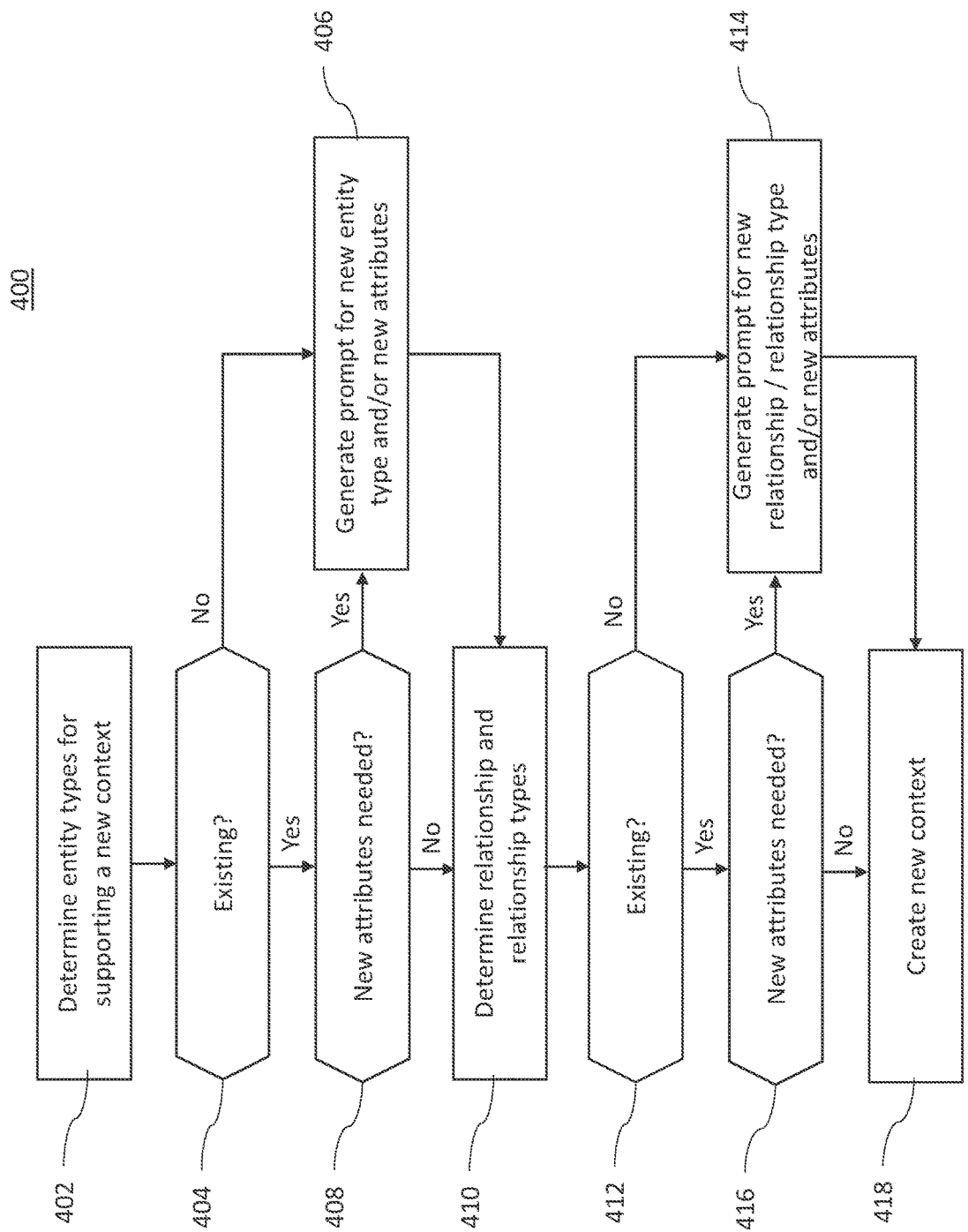
FIG. 4 depicts a flowchart showing an example method of supporting a new context, according to an example embodiment.

Referring now to FIG. 4, depicted is a flowchart showing an example method 400 of supporting a new context received from a computing device 104. The steps shown in FIG. 4 may be performed by various components shown in FIG. 1 and FIG. 2 described above, such as the data object management system 102 and/or one or more components thereof, the computing device(s) 104, etc. As a brief overview of method 400, at step 402, the context manager 124 may determine entity types for supporting a new context. At step 404, the context manager 124 may determine whether the entity types are existing entity types. Where the entity types are new entity types, the method 400 may proceed to step 406, where the context manager 124 generates a prompt for a new entity type and/or new attributes for the entity type. Where the entity types are existing entity types, the method 400 may proceed to step 408, where the context manager 124 determines whether new attributes are needed for the entity types. Where new attributes are needed, the context manager 124 may proceed back to step 406. At step 410, the context manager 124 may determine relationship and relationship types for supporting the new context. At step 412, the context manager 124 may determine whether the relationship and relationship types are existing relationship and relationship types. Where the relationship and relationship types are new relationship and relationship types, the method 400 may proceed to step 414, where the context manager 124 generates a prompt for a new relationship and relationship types and/or new attributes. Where the relationship and relationship types are existing relationship and relationship types, the method 400 may proceed to step 416, where the context manager 124 determines whether new attributes are needed for the relationship and relationship types. Where new attributes are needed, the context manager 124 may proceed back to step 414. At step 418, the context manager 124 may generate the new context.

At step 402, the context manager 124 may determine entity types for supporting a new context. As described above, the context manager 124 may receive a plurality of entity types corresponding to a particular context. The context manager 124 may receive the entity types from the computing device 104 upon establishing or otherwise providing a new context. As such, the new context may include a plurality of entity types which are relevant to the particular context. As an example, a new context may only be related to individuals. In such an example, the new context may include a selection of individual entity as the sole entity type which is relevant to the new context. As another example, a new context may only be related to non-governmental entities (e.g., individuals, corporations or companies, private universities, etc.). In such an example, the new context may include a selection of individual entity, corporate entity, and private university as the relevant entities related to the new context.

At step 404, the context manager 124 may determine whether the entity types are existing entity types. For example, the context manager 124 may maintain a list or ledger of available entity types which are supported by the data object management system 102. The context manager 124 may determine whether an entity type received at step 402 is supported by the data object management system 102 by cross-referencing the entity type with the list of available entity types.

Where an entity type is a new entity type, the method 400 may proceed to step 406, where the context manager 124 generates a prompt for a new entity type and/or new attributes for the entity type. In other words, where a specified entity type received at step 402 is not currently supported by the data object management system 102, the context manager 124 may generate a flag or trigger for the data object management system 102 to add the specified entity type to the system 102 and attributes corresponding thereto. For example, the context manager 124 may cause the base layer manager 114 to add the entity type to the list or ledger of available entity types provided or supported by the system 102, and associate each of the attributes with to the entity type. As such, where a user subsequently selects the newly added entity type (e.g., when adding a new entity at the computing device 104), the attributes corresponding to the entity may automatically be displayed for providing value(s) corresponding thereto.

In some embodiments, where a user subsequently defines a conditional rule within the new context, and the user may define the conditional rule according to the new entity types/values corresponding to the new attributes. In some embodiments, the base layer manager 114 may be configured to determine to obtain to obtain additional values corresponding to an entity base layer data object based on the conditional rule and the existing entity values. For example, where a conditional rule within a new context leverages attributes of a new entity type, and values corresponding to the new attributes have not been populated to the entity base layer data objects, the base layer manager 114 may be configured to determine to obtain additional values corresponding to the new attributes (e.g., based on the absence of values corresponding to the new attributes, based on a flag corresponding to the new attribute, etc.). The base layer manager 114 may transmit a prompt to the computing device 104 for obtaining the additional values corresponding to the new attributes. Once the base layer manager 114 receives the additional values corresponding to the new attributes, the base layer manager 114 may update the base layer data objects 108 corresponding thereto (e.g., to populate the base layer data objects 108 with the additional values corresponding to the new attributes).

Where the entity types are existing entity types, the method 400 may proceed to step 408, where the context manager 124 determines whether new attributes are needed for the entity types. Similar to identifying a new entity type, the context manager 124 may maintain a list or ledger of attributes maintained or otherwise available corresponding to particular entity types. Where new attributes are needed (e.g., based on attributes specified for the particular new context), the context manager 124 may proceed back to step 406, where the context manager 124 generates a prompt for obtaining new attributes in association with the entity type. In this regard, the context manager 124 may associate the new attributes with an existing entity type (which may cause the base layer manager 114 to prompt for additional values corresponding to the new attributes).

At step 410, the context manager 124 may determine relationship and relationship types for supporting the new context. For example, the context manager 124 may receive a plurality of relationship and relationship types corresponding to the new context. The context manager 124 may receive the relationship and relationship types from the computing device 104 upon establishing or otherwise providing a new context. As such, the new context may include a plurality of relationship and corresponding relationship types which are relevant to the particular context. As an example, a new context may be related to accounting, and therefore the relationships may include each of the relationships corresponding to a relationship type of economic receipts or a relationship type of economic expenditures.

Steps 412-416 may be similar in some aspects to steps 404-408. For example, at step 412, the context manager 124 may determine whether the relationship and relationship types are existing relationship and relationship types. The context manager 124 may maintain a list or ledger corresponding to relationship and relationship types provided by the data object management system 102. The context manager 124 may determine whether certain relationship and relationship types received or determined at step 410 are supported by the data object management system 102 by cross-referencing the relationship and relationship types with the list of available relationship and relationship types.

Where the relationship and relationship types are new relationship and relationship types, the method 400 may proceed to step 414, where the context manager 124 generates a prompt for a new relationship and relationship types and/or new attributes. The context manager 124 causes an update to the particular relationship/relationship type/attributes which are supported by the data object management system 102. Similarly, where a conditional rule leverages potential values of attributes corresponding to a new relationship, the base layer manager 114 may determine to obtain additional values corresponding to base layer data object 108. The base layer manager 114 may generate a prompt for obtaining the additional values from the computing device 104, and may update the base layer data object 108 responsive to receiving the additional values. Where the relationship and relationship types are existing relationship and relationship types, the method 400 may proceed to step 416, where the context manager 124 determines whether new attributes are needed for the relationship and relationship types. Where new attributes are needed, at step 414, the context manager 124 may cause the data object management system 102 to update the list or ledger of attributes which are associated with a particular relationship or relationship type, which may further cause the base layer manager 114 to obtain new values corresponding to the attributes.

At step 418, the context manager 124 may generate the new context. The context manager 124 may maintain, provide, or otherwise generate the new context to include each of the entity types, entity attributes, relationships, relationship types, and relationship attributes which are relevant or otherwise related to the new context. As such, where a user of the computing device 104 generates a new conditional rule within the particular context, the user may leverage the relevant entity types, entity attributes, relationships, relationship types, and relationship attributes within the particular context. Such embodiments may provide for base layer data objects which are granular in nature (e.g., by having values corresponding to attributes which support a variety of different context), which are leveraged to identify or map relationships across the variety of different context.

Figure 5:
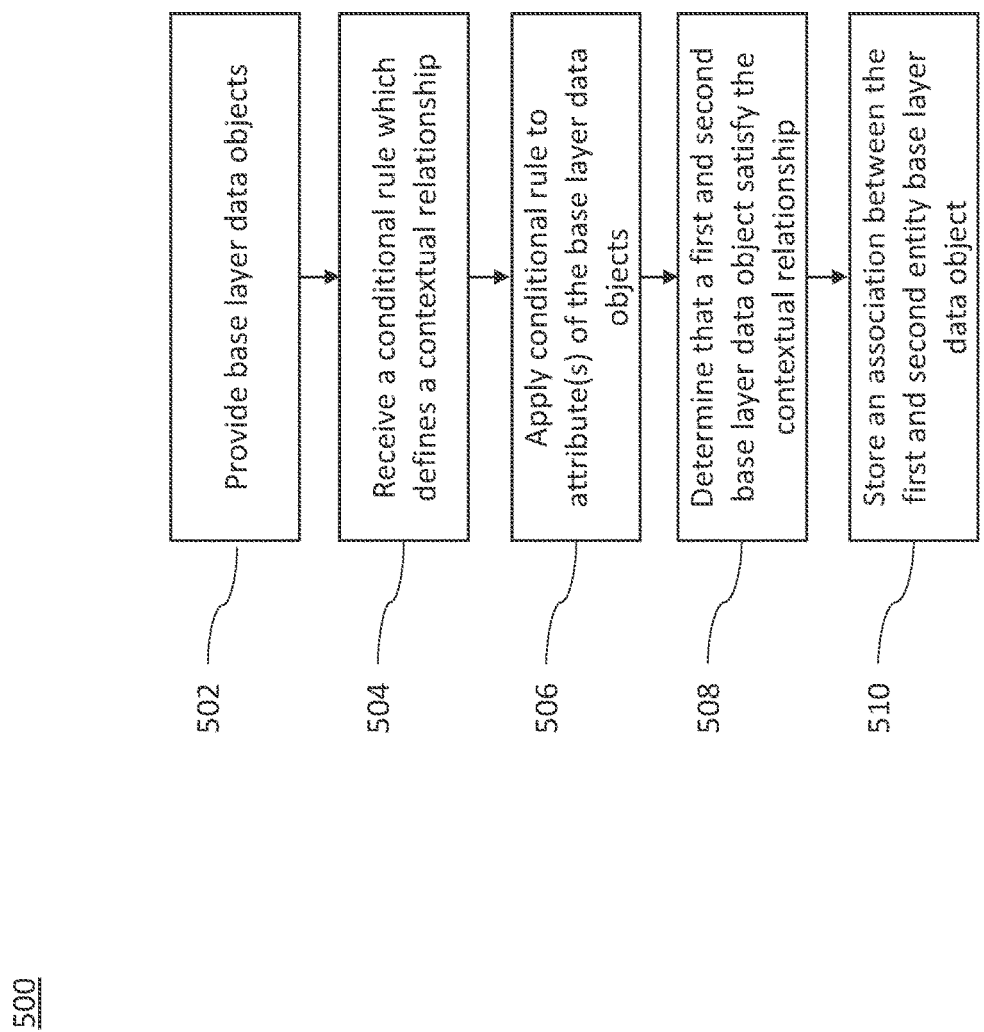
FIG. 5 depicts a flowchart showing an example method of identifying entities which satisfy a contextual relationship, according to an example embodiment.

Referring now to FIG. 5, depicted is a flowchart showing an example method 500 of identifying entities which satisfy a contextual relationship, according to an illustrative embodiment. The steps shown in FIG. 5 may be performed by various components shown in FIG. 1 and FIG. 2 described above, such as the data object management system 102 and/or one or more components thereof, the computing device(s) 104, etc. As a brief overview of the method 500, at step 502, the relationship manager 120 may provide a plurality of base layer data objects. At step 504, the relationship manager 120 may receive a conditional rule which defines a contextual relationship. At step 506, the relationship manager 120 may apply the conditional rule to attribute(s) of the base layer data objects. At step 508, the relationship manager 120 may determine that a first entity base layer data object and a second entity base layer data object satisfy the contextual relationship. At step 510, the relationship manager 120 may store an association between the first entity base layer data object and the second entity base layer data object.

At step 502, the relationship manager 120 may provide a plurality of base layer data objects. In some embodiments, the relationship manager 120 may provide the plurality of base layer data objects including a subset of entity base layer data objects corresponding to a respective entity and a subset of relationship base layer data objects corresponding to a respective root relationship between two or more entities. The base layer data objects may be similar to the base layer data objects described above in Section 1 and with respect to FIG. 3. As such, the base layer data objects may include entity and relationship base layer data objects. The base layer data objects may include data which characterizes, quantifies, or otherwise defines the entity and/or the root relationship. For example, the base layer data objects may include data corresponding to the entity/relationship type, and data corresponding to attributes of the entity/relationship.

In some embodiments, an entity base layer data object of an entity is maintained in association with one or more relationship base layer data objects corresponding to one or more root relationships of the entity with one or more other entities. For example, and as shown in Table 5 above, a relationship base layer data object may include data which identifies or is otherwise associated with respective entity base layer data objects. As such, the relationship base layer data object may be representative of a root relationship between two entities, and may therefore be associated with the At step 504, the relationship manager 120 may receive a conditional rule which defines a contextual relationship. In some embodiments, the relationship manager 120 may receive the conditional rule form a computing device. The conditional rule may define a contextual relationship (e.g., a potential contextual relationship) between two entity base layer data objects. The conditional rule may be defined using one or more potential values corresponding to the one or more attributes of the plurality of base layer data objects. For example, the conditional rule may be defined using a potential value or range of values corresponding to a relationship base layer data object for a root relationship. In some embodiments, a conditional rule may include a plurality of criteria (e.g., which may be joined by various operators). Examples of criteria are described above with reference to Table 8. In some embodiments, a contextual relationship may be defined according to a plurality of conditional rules. For example, the relationship manager 120 may receive a first conditional rule and a second conditional rule corresponding to a contextual relationship. In some implementations, the first conditional rule and second conditional rule may execute in parallel such that the contextual relationship is identified based on either of the conditional rules being satisfied. As such, a subset of entities may have the contextual relationship by satisfying either of the conditional rules. In some implementations, the second conditional rule may override or supersede the first conditional rule (e.g., thereby redefining the contextual relationship). As such, a subset of entities may have the contextual relationship by satisfying the first conditional rule, and may no longer have the contextual relationship by not satisfying the second conditional rule. Similarly, a subset of entities may not have the contextual relationship by being unable to satisfy the first conditional rule, but may subsequently have the contextual relationship by satisfying the second conditional rule.

At step 506, the relationship manager 120 may apply the conditional rule to attribute(s) of the base layer data objects. In some embodiments, the relationship manager 120 may apply the conditional rule to at least the one or more attributes of a first entity base layer data object and a second entity base layer data object. In some embodiments, the relationship manager 120 manager may apply the conditional rule to one or more attributes of a relationship layer data object corresponding to the first and second entity base layer data objects. The relationship manager 120 may apply the conditional rule to values corresponding to the one or more attributes. In embodiments where a contextual relationship includes a plurality of conditional rules, the relationship manager 120 may apply each of the conditional rules to the one or more attributes, may serially apply the conditional rules to the one or more attributes until a conditional rule is satisfied, etc.

At step 508, the relationship manager 120 may determine that the first entity base layer data object and the second entity base layer data object satisfy the contextual relationship. In some embodiments, the relationship manager 120 may determine that the first and second entity base layer data objects of the subset of entity base layer data objects satisfy the contextual relationship. The relationship manager 120 may determine that the first and second entity base layer data objects satisfy the contextual relationship based on the values of the attributes corresponding to the data objects satisfying the conditional rule(s) applied thereto. For example, the relationship manager 120 may determine that the first and second entity base layer data objects satisfy the contextual relationship responsive to a relationship base layer data object corresponding to the first and second entity base layer data object having values which satisfy one or more of the conditional rules corresponding to the contextual relationship.

At step 510, the relationship manager 120 may store an association between the first entity base layer data object and the second entity base layer data object. In some embodiments, the relationship manager 120 may store an association between the first entity base layer data object and the second entity base layer data object in accordance with the contextual relationship. The relationship manager 120 may store an association in one or more data structures or sources (such as data source(s) 106). The relationship manager 120 may store the association as a relationship mapping of the first and second entity base layer data objects. In some embodiments, the relationship mapping may include an identifier corresponding to the contextual relationship, an identifier corresponding to the conditional rule which was satisfied, etc.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
   one or more servers communicably coupled to a plurality of computing devices, wherein the one or more servers are configured to:
   receive, from a first computing device, a plurality of first data points associated with a plurality of entities, the plurality of first data points having one or more entity values;
   receive, from the first computing device, a plurality of second data points associated with one or more root relationships between two or more of the plurality of entities, the plurality of second data points having one or more relationship values;
   generate a plurality of base layer data objects for the plurality of first data points and the plurality of second data points;
   provide, to the plurality of computing devices including the first computing device, access to the plurality of base layer data objects for identifying contextual relationships between respective base layer data objects;
   generate, for at least one of the plurality of computing devices, a user interface to receive input from a user defining one or more conditional rules;
   receive, from at least one of the plurality of computing devices, a first conditional rule and a second conditional rule defining one or more contextual relationships comprising at least one of a parallel relationship or a superseding relationship;
   apply the first and second conditional rules to the data corresponding to the one or more entity values and/or the one or more relationship values, to determine that a first base layer data object and a second base layer data object have the one or more contextual relationships based on satisfying the first conditional rule or the second conditional rule; and
   store, in one or more data structures, an association between the first base layer data object and the second base layer data object, according to determining that the first base layer data object and the second base layer data object have the one or more contextual relationships.

2. The system of claim 1, wherein the first conditional rule defines a first contextual relationship between two or more of the plurality of entity base layer data objects, wherein the first conditional rule is defined using data corresponding to potential values of the one or more entity values and/or the one or more relationship values; and
   the second conditional rule defines a second contextual relationship between two or more of the plurality of base layer data objects, wherein the second conditional rule is defined using the data corresponding to potential values of the one or more entity values and/or the one or more relationship values.

3. The system of claim 2, wherein the one or more servers are further configured to:
   determine, based on the potential values corresponding to the first conditional rule and the one or more entity values of the plurality of entity base layer data objects, to obtain additional values corresponding to an entity base layer data object;
   generate, in response to the determination, one or more prompts to obtain the additional values corresponding to the entity base layer data object; and
   update the entity base layer data object using the obtained additional values.

4. The system of claim 2, wherein the one or more servers are further configured to:
   determine, based on the potential values corresponding to the first conditional rule and the one or more relationship values of the plurality of relationship base layer data objects, to obtain additional values corresponding to a relationship base layer data object;
   generate, in response to the determination, one or more prompts to obtain the additional values corresponding to the relationship base layer data object; and
   update the relationship base layer data object using the obtained additional values.

5. The system of claim 1, wherein the one or more servers are further configured to:
   apply a governing policy to the one or more attributes of the root relationship between the two or more entities, to determine whether to generate a relationship base layer data object corresponding to the root relationship; and generate, responsive to the one or more attributes satisfying the governing policy, the relationship base layer data object corresponding to the root relationship.

6. The system of claim 1, wherein the one or more servers are further configured to:
apply a governing policy to one or more attributes of an entity, to determine whether to generate an entity base layer data object corresponding to the entity; and
generate, responsive to the one or more attributes satisfying the governing policy, the entity base layer data object corresponding to the entity.

7. The system of claim 1, wherein the root relationship type is selected from one of a plurality of mutually exclusive root relationship types, wherein the plurality of mutually exclusive root relationship types comprise at least one of an ownership root relationship type, an influence root relationship type, an economic receipts root relationship type, an economic expenditures root relationship type, an economic guarantor root relationship type, an economic employment root relationship type, a familial root relationship type, or a government root relationship type.

8. The system of claim 1, wherein the one or more relationship values comprise a first value corresponding to a relationship, a second value corresponding to a relationship type, a third value corresponding to a left entity type, a fourth value corresponding to a right entity type, and a fifth value corresponding to a directionality.

9. The system of claim 1, wherein the one or more relationship values comprise a plurality of values which are associated with the root relationship type.

10. The system of claim 1, wherein the base layer data objects include a plurality of entity base layer data objects and a plurality of relationship base layer data objects.

11. The system of claim 1, wherein the one or more servers are configured to receive the first conditional rule from a second computing device, the first conditional rule defined according to a context of the second computing system.

12. The system of claim 11, wherein the one or more servers are configured to receive the second conditional rule from a third computing device, the second conditional rule defined according to a context of the third computing system.

13. A method, comprising:
receiving, by one or more servers from a first computing device, a plurality of first data points associated with a plurality of entities, the plurality of first data points having one or more entity values;
receiving, by the one or more servers, from the first computing device, a plurality of second data points associated with one or more root relationships between two or more of the plurality of entities, the plurality of second data points having one or more relationship values;
generating, by the one or more servers, a plurality of base layer data objects for the plurality of first data points the plurality of second data points;
providing, by the one or more servers to the plurality of computing devices including the first computing device, access to the plurality of base layer data objects for identifying contextual relationships between respective base layer data objects;
generating, by the one or more servers for at least one of the plurality of computing devices, a user interface to receive input from a user defining one or more conditional rules;
receiving, by the one or more servers from at least one of the plurality of computing devices, a first conditional rule and a second conditional rule defining one or more contextual relationships comprising at least one of a parallel relationship or a superseding relationship;
applying, by the one or more servers, the first and second conditional rules to the data corresponding to the one or more entity values and/or the one or more relationship values, to determine that a first base layer data object and a second base layer data object have the one or more contextual relationships based on satisfying the first conditional rule or the second conditional rule; and
storing, by the one or more servers in one or more data structures, an association between the first base layer data object and the second base layer data object, according to determining that the first base layer data object and the second base layer data object have the one or more contextual relationships.

14. The method of claim 13, wherein the first conditional rule defines a first contextual relationship between two or more of the plurality of entity base layer data objects, wherein the first conditional rule is defined using data corresponding to potential values of the one or more entity values and/or the one or more relationship values; and
the second conditional rule defines a second contextual relationship between two or more of the plurality of base layer data objects, wherein the second conditional rule is defined using the data corresponding to potential values of the one or more entity values and/or the one or more relationship values.

15. The method of claim 14, further comprising:
determining, based on the potential values corresponding to the first conditional rule and the one or more entity values of the plurality of entity base layer data objects, to obtain additional values corresponding to an entity base layer data object;
generating, in response to the determination, one or more prompts to obtain the additional values corresponding to the entity base layer data object; and
updating the entity base layer data object using the obtained additional values.

16. The method of claim 14, further comprising:
determining, based on the potential values corresponding to the first conditional rule and the one or more relationship values of the plurality of relationship base layer data objects, to obtain additional values corresponding to a relationship base layer data object;
generating, in response to the determination, one or more prompts to obtain the additional values corresponding to the relationship base layer data object; and
updating the relationship base layer data object using the obtained additional values.

17. The method of claim 13, further comprising:
applying, by the one or more servers, a governing policy to the one or more attributes of the root relationship between the two or more entities, to determine whether to generate a relationship base layer data object corresponding to the root relationship; and
generating, by the one or more servers responsive to the one or more attributes satisfying the governing policy, a relationship base layer data object for the root relationship.

18. A non-transitory computer readable medium having instructions stored thereon which, when executed by a processor, cause the processor to:

receive, from a first computing device, a plurality of first data points associated with a plurality of entities, the plurality of first data points having one or more entity values;

receive, from the first computing device, a plurality of second data points associated with one or more root relationships between two or more of the plurality of entities, the plurality of second data points having one or more relationship values;

generate a plurality of base layer data objects for the plurality of first data points and the plurality of second data points;

provide, to the plurality of computing devices including the first computing device, access to the plurality of base layer data objects for identifying contextual relationships between respective base layer data objects;

generate, for at least one of the plurality of computing devices, a user interface to receive input from a user defining one or more conditional rules;

receive, from at least one of the plurality of computing devices, a first conditional rule and a second conditional rule defining one or more contextual relationships comprising at least one of a parallel relationship or a superseding relationship;

apply the first and second conditional rules to the data corresponding to the one or more entity values and/or the one or more relationship values, to determine that a first base layer data object and a second base layer data object have the one or more contextual relationships based on satisfying the first conditional rule or the second conditional rule; and store, in one or more data structures, an association between the first base layer data object and the second base layer data object, according to determining that the first base layer data object and the second base layer data object have the one or more contextual relationships.

19. The non-transitory computer readable medium of claim 18, wherein the first conditional rule defines a first contextual relationship between two or more of the plurality of entity base layer data objects, wherein the first conditional rule is defined using data corresponding to potential values of the one or more entity values and/or the one or more relationship values; and the second conditional rule defines a second contextual relationship between two or more of the plurality of base layer data objects, wherein the second conditional rule is defined using the data corresponding to potential values of the one or more entity values and/or the one or more relationship values.

20. The non-transitory computer readable medium of claim 19, wherein the instructions further cause the processor to:

apply the first conditional rule to the one or more entity values and/or the one or more relationship values to identify a first entity and a second entity which satisfy the first contextual relationship;

store, in one or more data structures, a first association between a first entity base layer data object for the first entity and a second entity base layer data object for the second entity in accordance with the first contextual relationship;

apply the second conditional rule to the one or more entity values and/or the one or more relationship values to identify the first entity and the second entity which satisfy the second contextual relationship;

store, in one or more data structures, a second association between the first entity base layer data object for the first entity and the second entity base layer data object for the second entity in accordance with the second contextual relationship.

\* \* \* \* \*